(12) United States Patent
Severson et al.

(10) Patent No.: US 12,420,945 B2
(45) Date of Patent: Sep. 23, 2025

(54) CHARGED AIR MASS MEASUREMENT FOR AIR DATA COMPUTATION

(71) Applicant: The Boeing Company, Arlington, VA (US)

(72) Inventors: Mark D. Severson, Coupeville, WA (US); Dejan Nikic, Seattle, WA (US); James A. Grossnickle, Bellevue, WA (US); Michelle Galgana, Burien, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/765,268

(22) Filed: Jul. 7, 2024

(65) Prior Publication Data

US 2024/0359818 A1    Oct. 31, 2024

Related U.S. Application Data

(63) Continuation of application No. 17/505,111, filed on Oct. 19, 2021, now Pat. No. 12,037,131.

(51) Int. Cl.
*B64D 43/02* (2006.01)
*G01C 5/00* (2006.01)
(Continued)

(52) U.S. Cl.
CPC ............ *B64D 43/02* (2013.01); *G01C 5/005* (2013.01); *G01K 7/00* (2013.01); *G01P 5/08* (2013.01)

(58) Field of Classification Search
CPC .......... B64D 43/02; G01C 5/005; G01K 7/00; G01P 5/08
See application file for complete search history.

(56) References Cited

U.S. PATENT DOCUMENTS

| | | | | |
|---|---|---|---|---|
| 3,119,259 A | * | 1/1964 | Maurits ..................... | G01P 5/08 73/861.12 |
| 3,523,452 A | * | 8/1970 | Cason ....................... | G01F 1/60 73/861.16 |

(Continued)

OTHER PUBLICATIONS

Chu, Jennifer, "MIT engineers fly first-ever plane with no moving parts," Massachusetts Institute of Technology, Nov. 21, 2018, retrieved from http://news.mit.edu/2018/first-ionic-wind-plane-no-moving-parts-1121, pp. 1-11.

*Primary Examiner* — Lisa M Caputo
*Assistant Examiner* — Sharah Zaab
(74) *Attorney, Agent, or Firm* — Moore IP Law

(57) ABSTRACT

Systems and methods for enabling charged (ionized) air mass measurement for reliable air data computation onboard an aircraft. Ionic charge sensing may be used to derive air data having improved reliability. The systems and methods for ionic charge sensing employ an emitter electrode and two or more collector electrodes, which electrodes are disposed in proximity to the exterior skin of the aircraft and exposed to ambient air. The emitter electrode is positioned forward of the collector electrodes. The system further includes a solid-state ionic air data module that converts currents from the collector electrodes into air data parameter values. More specifically, the ionic air data module is configured to sense currents induced in the collector electrodes in response to corona discharge produced by the high-voltage emitter electrode.

20 Claims, 5 Drawing Sheets

(51) Int. Cl.
*G01K 7/00* (2006.01)
*G01P 5/08* (2006.01)

(56) References Cited

U.S. PATENT DOCUMENTS

| | | | |
|---|---|---|---|
| 5,689,251 A * | 11/1997 | Houck | G01P 11/00 |
| | | | 340/978 |
| 6,134,485 A | 10/2000 | Tanielian et al. | |
| 6,928,341 B2 | 8/2005 | Wise | |
| 6,937,937 B1 * | 8/2005 | Manfred | G01W 1/10 |
| | | | 340/971 |
| 7,347,090 B1 | 3/2008 | Childers et al. | |
| 8,171,770 B2 | 5/2012 | Nugent et al. | |
| 8,761,970 B2 | 6/2014 | Mcintyre et al. | |
| 8,944,370 B2 | 2/2015 | Khozikov et al. | |
| 9,845,146 B2 | 12/2017 | Beaufrere | |
| 9,884,685 B2 | 2/2018 | Bartz et al. | |
| 2009/0306927 A1 * | 12/2009 | Brivet | G01K 13/028 |
| | | | 702/141 |
| 2013/0066488 A1 | 3/2013 | Walter | |
| 2015/0239552 A1 | 8/2015 | Nikic | |
| 2020/0304217 A1 * | 9/2020 | Jha | B64F 5/60 |
| 2020/0363444 A1 * | 11/2020 | Tillotson | G01F 1/588 |
| 2020/0386213 A1 * | 12/2020 | Barrett | B64G 1/413 |

\* cited by examiner

CHARGED AIR MASS MEASUREMENT FOR AIR DATA COMPUTATION

RELATED PATENT APPLICATION

This application is a continuation of and claims priority from U.S. patent application Ser. No. 17/505,111 filed on Oct. 19, 2021.

BACKGROUND

This disclosure relates generally to systems and methods for measuring and analyzing physical parameters near a surface of an object and, in particular, to systems and methods for acquiring "air data" for use in flight control of an aircraft.

Aircraft typically include a variety of air mass measurement devices and air data sensors for measuring parameters associated with air flow during flight. For example, air data sensors may measure airspeed, air pressure, and air temperature as well as local air flow angles as the aircraft disturbs the air through which it flies. Measured flow angles may include angle of attack and angle of sideslip (the lateral component of the aircraft velocity). Accurate measurements of angles of attack and sideslip are necessary for safe operation of the aircraft as such measurements form the basis for the computation of air data which is provided to flight control computers to facilitate control of the aircraft. For example, altitude is derived from a series of equations using the static pressure, whereas temperature is used to calculate true airspeed (the actual speed of the plane through air). These measured parameters are typically input to an air data computer or air data inertial reference unit (ADIRU), which, using algorithms and correction factors (or calibrations), can provide other parameters, such as true airspeed, required by the flight control system.

Existing air data probes and sensors have inherent design vulnerabilities. For example, existing air data probes such as pitot tubes, static ports, and total air temperature (TAT) probes are vulnerable to failure due to ingestion of foreign object debris. Also, existing angle of attack (AOA) sensor failure may occur due to wind vane damage or improper rigging. In addition, erroneous air data sensing or failure may occur due to ice contamination. It would be desirable to substitute air data sensors having improved reliability as compared to existing air data probes and sensors.

SUMMARY

The subject matter disclosed in detail below is directed to systems and methods for enabling charged (ionized) air mass measurement for reliable air data computation onboard an aircraft. More specifically, ionic charge sensing is used to derive air data having improved reliability with respect one or more of the following parameters: airspeed, pressure altitude, angle of attack, sideslip, and total air temperature.

In accordance with various embodiments, the systems and methods for air data computation using ionic charge sensing disclosed herein employ an emitter electrode and two or more collector electrodes, which electrodes are disposed in proximity to the exterior skin of the aircraft and exposed to ambient air. The emitter electrode is positioned forward of the collector electrodes. The system further includes an ionic air data module that is configured with solid-state circuitry that converts currents from the collector electrodes into air data parameter values. More specifically, the ionic air data module is configured to sense currents induced in the collector electrodes in response to the corona discharge produced by the emitter electrode when the latter is supplied with high-voltage power.

As used herein, the term "solid-state circuit" means an integrated circuit on a printed circuit board. As used herein, the term "corona discharge" refers to the process by which a current flows from an electrode with a high potential into a neutral fluid, usually air, by ionizing that fluid so as to create plasma which occupies the space around the electrode. The ions generated eventually pass the charge to nearby areas of lower potential, or recombine to form neutral gas molecules. As used herein, the term "ionic charge" means the electrical charge of an ion created by the gain (negative charge) or loss (positive charge) of one or more electrons from an atom or group of atoms.

The ionic charge sensing technique and ionic air data module proposed herein rely on free electrons which are created through ionization at a fixed high-voltage emitter electrode. The free electrons propagate within the boundary layer at the aircraft surface and then flow (relative to the aircraft) toward fixed downstream grounded collector electrodes. In accordance with one embodiment disclosed herein, the resulting currents induced in a pair of collector electrodes are measured by the ionic air data module. The difference or ratio of the two measured currents may then be used for air data computation relative to the air mass surrounding the aircraft.

The ionic charge sensing system proposed herein is attended by manifold benefits. The system is completely solid-state and non-mechanical with no moving parts and is flush with the skin of the aircraft. No mechanical calibration is required, thereby eliminating failure due to improper maintenance. Air data reliability is increased significantly due to the solid-state design. Also, the system's vulnerability to damage is significantly decreased as compared to existing air data probes and sensors.

Various embodiments of systems and methods for air data computation using ionic charge sensing are described in some detail later herein. At least one of those embodiments is characterized by one or more of the following aspects.

One aspect of the subject matter disclosed in detail below is a method for air data computation using ionic charge sensing during flight of an aircraft, comprising: generating a first voltage difference between an emitter electrode and a first collector electrode located in proximity to an outer surface of the aircraft and exposed to ambient air, the first collector electrode being aft of the emitter electrode, wherein a voltage supplied to the emitter electrode is high enough to ionize air molecules in a region surrounding the emitter electrode and the first voltage difference is large enough and the first collector electrode is sufficiently close to the emitter electrode to cause a first current to be produced in the first collector electrode; generating a second voltage difference between the emitter electrode and a second collector electrode located in proximity to the outer surface of the aircraft and exposed to ambient air, the second collector electrode being aft of the emitter electrode, wherein the second voltage difference is large enough and the second collector electrode is sufficiently close to the emitter electrode to cause a second current to be produced in the second collector electrode; sensing respective magnitudes of the first and second currents; and computing an ionic air data parameter value based at least in part on a relationship between the respective magnitudes of the first and second currents. In accordance with some embodiments, the relationship is a difference between the respective magnitudes of the first and second currents. In accordance with other embodiments, the relationship is a ratio of the respective magnitudes of the first and second currents.

Another aspect of the subject matter disclosed in detail below is an aircraft comprising: an exterior skin; a power supply; an emitter electrode connected to the power supply and disposed at a first position in proximity to the exterior skin and exposed to ambient air; a first collector electrode connected to ground and disposed at a second position in proximity to the exterior skin and exposed to ambient air, the second position being aft of the first position; a second collector electrode connected to ground disposed at a third position in proximity to the exterior skin and exposed to ambient air, the third position being aft of the first position; a first current sensor having an input connected to the first collector electrode and having an output; a second current sensor having an input connected to the second collector electrode and having an output; and a microcontroller connected to receive first and second output signals from the first and second current sensors respectively and configured to compute an ionic air data parameter value based at least in part on a relationship between the respective magnitudes of the first and second currents, wherein the electrodes are configured and arranged so that respective currents are induced in the first and second collector electrodes by ionic wind flowing from the emitter electrode toward the first and second collector electrodes while power is being supplied to the emitter electrode during flight of the aircraft. In accordance with one embodiment, the microcontroller comprises a non-transitory tangible computer-readable storage medium storing a calibration table which correlates relationships between respective magnitudes of first and second currents and ionic air data parameter values recorded during testing.

A further aspect of the subject matter disclosed in detail below is an aircraft comprising: an exterior skin; a power supply; an emitter electrode connected to the power supply and disposed at a position in proximity to the exterior skin and exposed to ambient air; a plurality of collector electrodes connected to ground and disposed at respective positions in proximity to the exterior skin and exposed to ambient air, the positions of the collector electrodes being aft of the position of the emitter electrode; a plurality of current sensors connected to respective collector electrodes and configured to output voltages representing magnitudes of respective currents in the collector electrodes; and a microcontroller connected to receive voltages from the plurality of current sensors and configured to compute an ionic air data parameter value based at least in part on the voltages received from the current sensors, wherein the electrodes are configured and arranged so that respective currents are induced in the plurality of collector electrodes by ionic wind flowing from the emitter electrode toward the collector electrodes while power is being supplied to the emitter electrode by the power supply during flight of the aircraft.

Other aspects of systems and methods for air data computation using ionic charge sensing are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of systems and methods for air data computation using ionic charge sensing are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
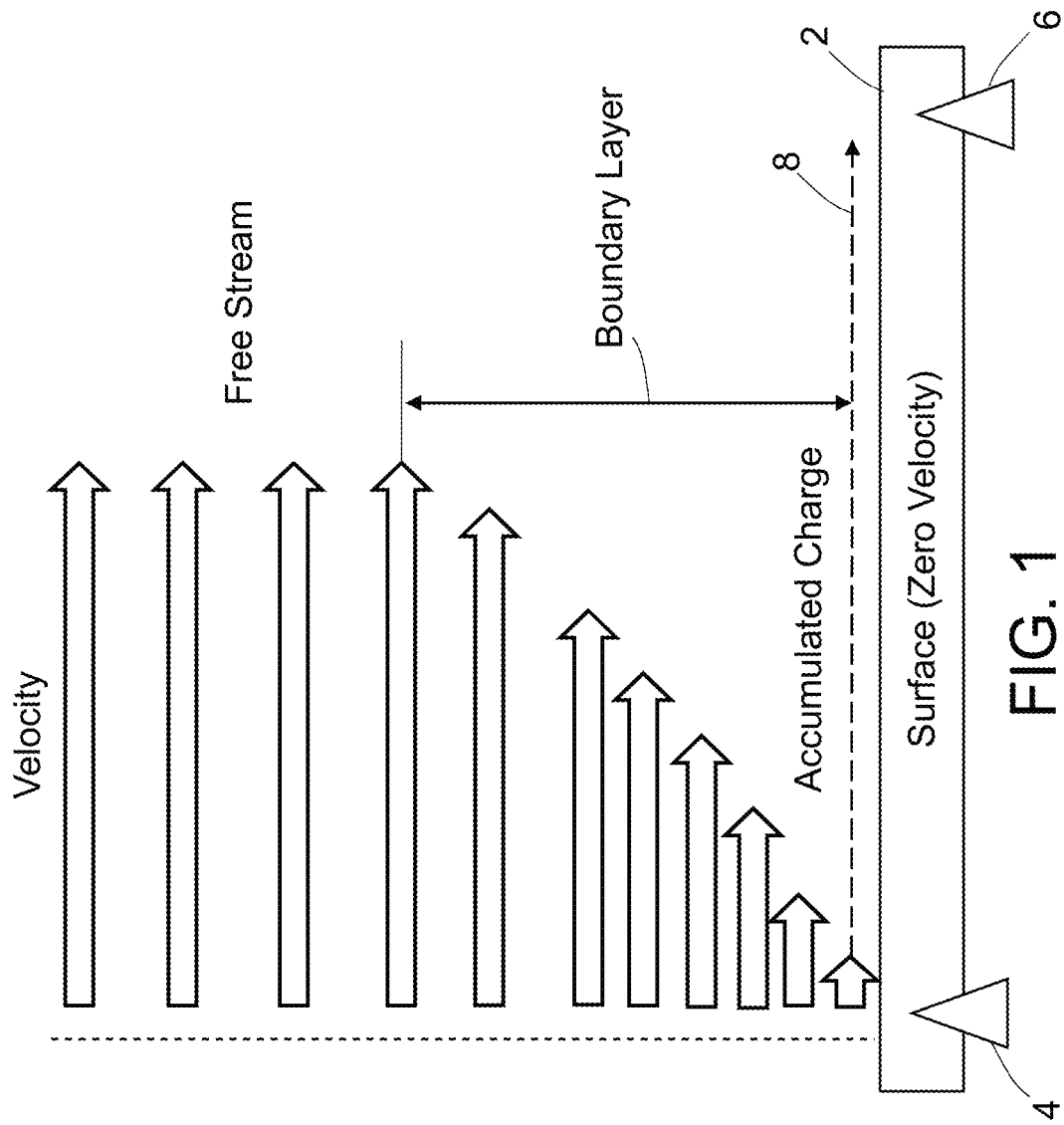
FIG. 1 is a diagram representing a sectional view of an exterior skin of an aircraft during flight (the aircraft is moving right to left). The arrows pointing rightward indicate ambient air moving relative to a skin surface having an ionization source exposed to the ambient air and a current sensing device exposed to the ambient air at a position downstream from the ionization source.

FIG. 1 is a diagram representing a sectional view of an exterior skin 2 of an aircraft during flight (the aircraft is moving right to left). The arrows pointing rightward indicate ambient air moving relative to exterior skin 2. The aircraft includes an ionization source 4 (e.g., a high-voltage emitter electrode) exposed to the ambient air and grounded detection points 6 (e.g., grounded collector electrodes) which are flush with or nearly flush with the exterior skin 2 while being exposed to ambient air. The grounded detection points 6 are located downstream from the ionization source 4.

FIG. 1 shows the theory of operation for enabling charged (ionized) air mass measurement during flight of the aircraft. The emitter and collector electrodes are configured and arranged so that respective currents are induced in the collector electrodes by ionic wind flowing from the emitter electrode toward the collector electrodes while power is being supplied to the emitter electrode by a high-voltage power supply during flight of the aircraft. More specifically, when the ionization source 4 (depicted conceptually in FIG. 1) is supplied with sufficiently high-voltage power, an electric field is produced. That electric field induces cascades of free electrons which collide with air molecules within the boundary layer adjacent to exterior skin 2 and consequently free up more electrons. The process generates charged air molecules in the vicinity of the ionization source 4 (a.k.a. corona discharge). The free electrons created through ionization propagate within the boundary layer and then flow to the grounded detection points 6 within the free stream, where the charge is sensed. The electrode height above the surface of the exterior skin 2 will be determined by the thickness of the boundary layer relative to sensor position on the aircraft.

The air data computation system proposed herein further includes an ionic air data module (not shown in FIG. 1) that is configured with solid-state circuitry that converts currents induced at the respective grounded detection points 6 into ionic air data. The ionic charges sensed at grounded detection points 6 may be used to derive air data having improved reliability with respect one or more of the following parameters: airspeed, pressure altitude, angle of attack, sideslip, and total air temperature.

In accordance with some embodiments, the systems for air data computation proposed herein employ an emitter electrode (as the ionization source 4) and two or more collector electrodes (at the grounded detection points 6), which electrodes are disposed in proximity to the exterior skin 2 of the aircraft and exposed to ambient air. The emitter electrode is positioned forward of the collector electrodes. More specifically, the charge accumulated in each collector electrode may be estimated by measuring the currents induced in the respective collector electrodes as a result of the ionization occurring upstream at the ionization source 4. Then the ionic air data module (not shown in FIG. 1, but described later with reference to FIGS. 3 and 4) computes the values of various air data parameters based on respective relationships of the detected currents.

Figure 2:
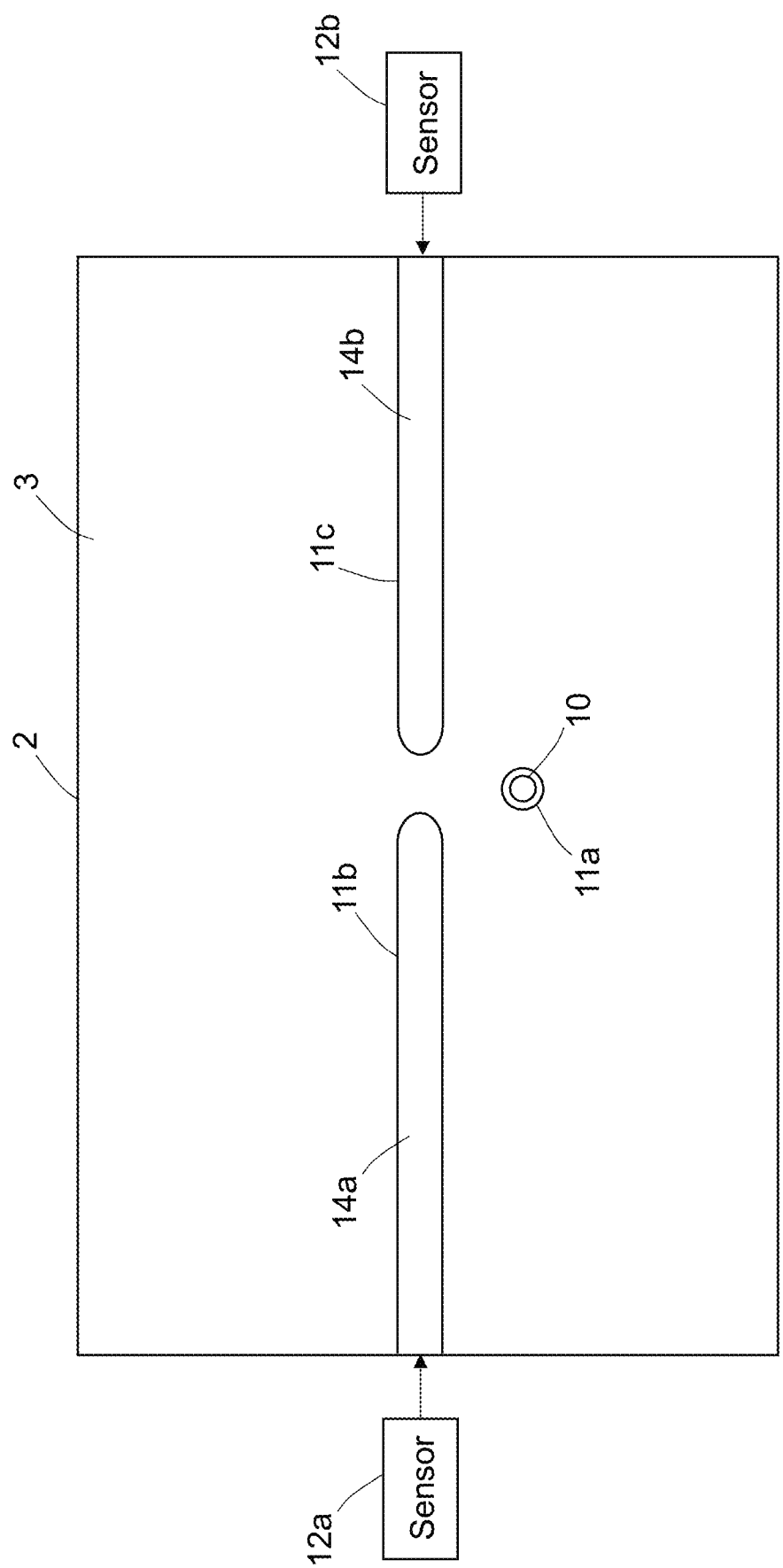
FIG. 2 is a diagram representing a top view showing external electrodes arranged for ionic current sensing on an exterior skin in accordance with one example implementation.

FIG. 2 is a diagram representing a top view showing external electrodes arranged for ionic current sensing at an exterior skin 2 in accordance with one example implementation. The exterior skin 2 has an aerodynamic surface 3 and three cavities 11a-11c which are open to the ambient atmosphere. The first cavity 11a is disposed at a position which is forward of the respective positions of the second cavity 11b and third cavity 11c. In this example, the ionization source 4 is an emitter electrode 10 in the form of electrically conductive wire having a tip (visible in FIG. 2) and the grounded detection points are a pair of collector electrodes 14a and 14b in the form of two straight, mutually coaxial, electrically conductive wires, the terminations of the respective wires being separated by a gap. The emitter electrode 10 is electrically connected to a high-voltage power supply (not shown in FIG. 2). The collector electrodes 14a and 14b are connected to ground and to respective current sensors 12a and 12b (which are components of the ionic air data module described in more detail below). The current sensors 12a and 12b are configured to output voltages representing magnitudes of respective currents induced in the collector electrodes 14a and 14b.

The collector electrodes 14a and 14b may have the same size and may be arranged symmetrically with respect to the emitter electrode 10. The tip of emitter electrode 10 is disposed in the first cavity 11a, which may be circular. The tip is either flush with the aerodynamic surface 3 or projects slightly beyond or below the plane of aerodynamic surface 3. In addition, one collector electrode 14a is disposed in the second cavity 11b and another collector electrode 14b is disposed in the third cavity 11c. The first and second collector electrodes 14a and 14b may have the same size and shape (in this example, straight wires) and may be arranged symmetrically with respect to the emitter electrode 10. The positions of the collector electrodes 14a and 14b are aft of the position of the emitter electrode 10. In the frame of reference of the aircraft, the collector electrodes 14a and 14b may have the same longitudinal position.

In the example electrode configuration depicted in FIG. 2, the axis of emitter electrode 10 lies in a plane of symmetry that passes through the midpoint of the gap and is perpendicular to the axis of collector electrodes 14a and 14b. However, it should be appreciated that the electrode configuration may include different numbers of electrodes arranged in accordance with different geometric patterns. For example, the emitter electrode 10 need not be a point source of ionization; the collector electrodes 14a and 14b need not be straight. Also, the electrode configuration may include more than one emitter electrode and more than two collector electrodes.

The electrodes may have any feasible shape and size, and may be constructed of any feasible conductive material. In one embodiment, the electrodes may be constructed of a copper foil. In other embodiments, electrode materials may be selected for conductive, structural, and/or other properties; example materials include graphite, carbon, titanium, brass, silver, and platinum. To enable the emitter electrode 10 to generate the desired electric field and to avoid electrical shorts, the portion of the aerodynamic surface 3 surrounding cavity 11a may be constructed of a dielectric material (or at least significantly less conductive than the material selected for emitter electrode 10). Consistent with generally desirable aerodynamic properties, some embodiments may provide an aerodynamic surface 3 that is constructed of carbon fiber-reinforced polymer or other composite material having a suitable strength-to-weight ratio.

In accordance with the proposed implementation depicted in FIG. 2, the method for air data computation using ionic charge sensing during flight of an aircraft comprises: (a) generating a first voltage difference between emitter electrode 10 and collector electrode 14a and (b) generating a second voltage difference between emitter electrode 10 and collector electrode 14b. As previously mentioned, the collector electrodes are grounded. The voltage supplied to the emitter electrode 10 is high enough to ionize air molecules in a region surrounding the emitter electrode 10. The first voltage difference is large enough and collector electrode 14a is sufficiently close to emitter electrode 10 to cause a first current to be produced in collector electrode 14a. Likewise the second voltage difference is large enough and collector electrode 14b is sufficiently close to emitter electrode 10 to cause a second current to be produced in collector electrode 14b. The current sensors 12a and 12b sense respective magnitudes of the first and second currents.

Figure 3:
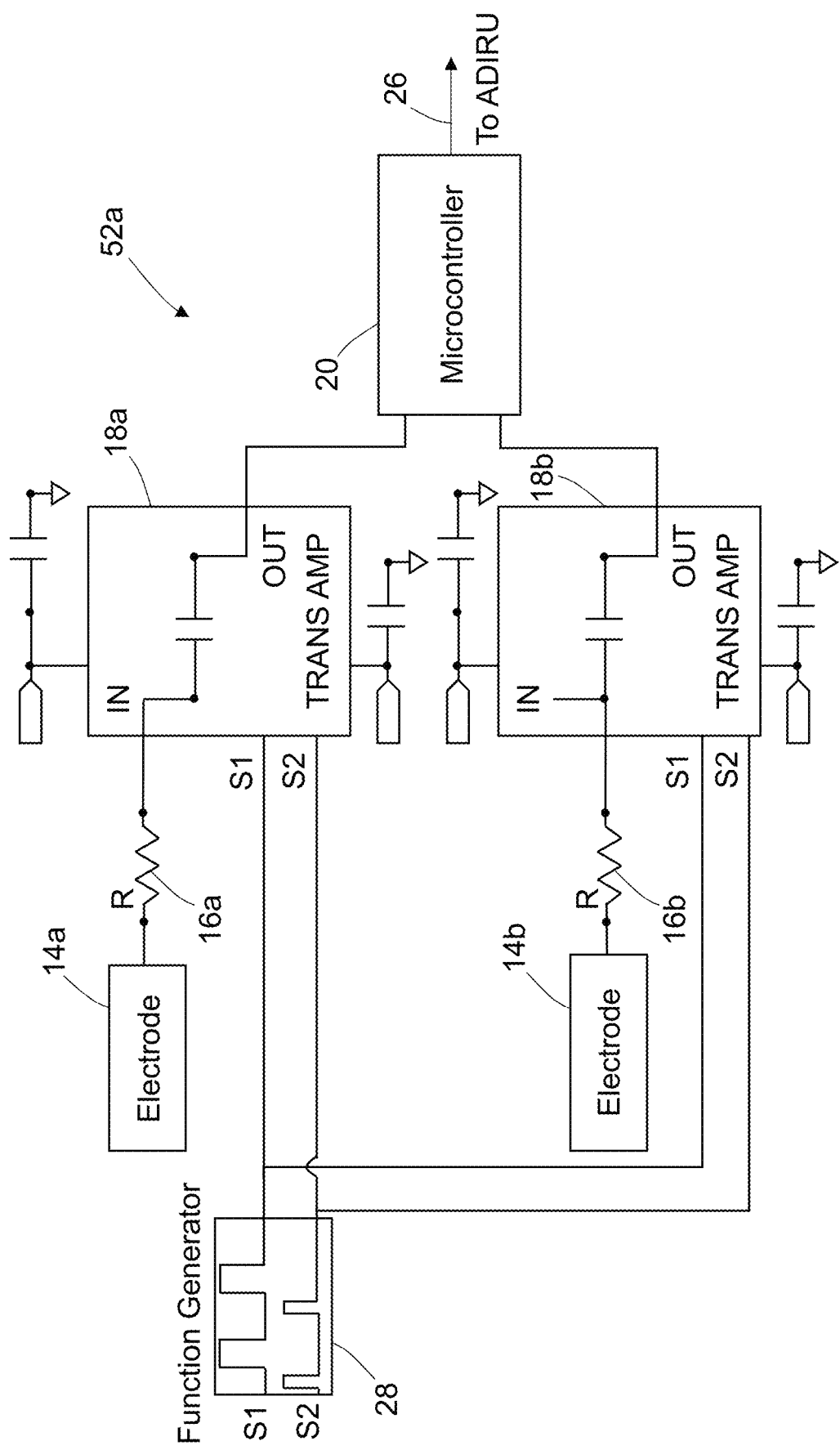
FIG. 3 is a circuit diagram identifying components of a solid-state ionic air data module in accordance with one proposed implementation.

FIG. 3 is a circuit diagram identifying components of a solid-state ionic air data module 52a (hereinafter "ionic air data module 52a") in accordance with one proposed implementation. The ionic air data module 52a reads the outputs from the collector electrodes 14a and 14b and integrates the signals to get current readings. The time integration of the electric current in each of the collector electrodes 14a and 14b is a measure of total electric charge. In the implementation depicted in FIG. 3, the current sensors of ionic air data module 52a are transimpedance amplifiers 18a and 18b, which are respectively electrically connected to integrate the electrical current from collector electrodes 14a and 14b. The transimpedance amplifier 18a has an input terminal that is electrically connected to collector electrode 14a by way of a load resistor 16a and the transimpedance amplifier 18b has an input terminal that is electrically connected to collector electrode 14b by way of a load resistor 16b. Each of the transimpedance amplifiers 18a and 18b is a current-to-voltage converter implemented using an operational amplifier, integrating capacitors, and switches. Each of the transimpedance amplifiers 18a and 18b integrates a respective low-level input current for a period of time controlled by timing inputs S1 and S2 generated by a function generator 28. The resulting voltage is stored on the integrating capacitor.

The ionic air data module 52a further includes a microcontroller 20 that is configured to measure a relationship (e.g., a difference or a ratio) between the voltages on the output terminals of transimpedance amplifiers 18a and 18b and compute an air data parameter value. The microcontroller 20 is configured to compute an ionic air data parameter value based at least in part on the respective voltages. More specifically, one input terminal of microcontroller 20 is electrically connected to an output terminal of transimpedance amplifier 18a, while the other input terminal of microcontroller 20 is electrically connected to an output terminal of transimpedance amplifier 18b. In addition, an output terminal of microcontroller 20 is electrically connected to a data distribution bus 26 for sending computed air data parameter values to an air data computer or to the air data processor of an air data and inertial reference unit (ADIRU). The air data part of the ADIRU provides airspeed, angle of attack, temperature and barometric altitude data, while the inertial reference part gives attitude, flight path vector, ground speed and positional data.

Figure 4:
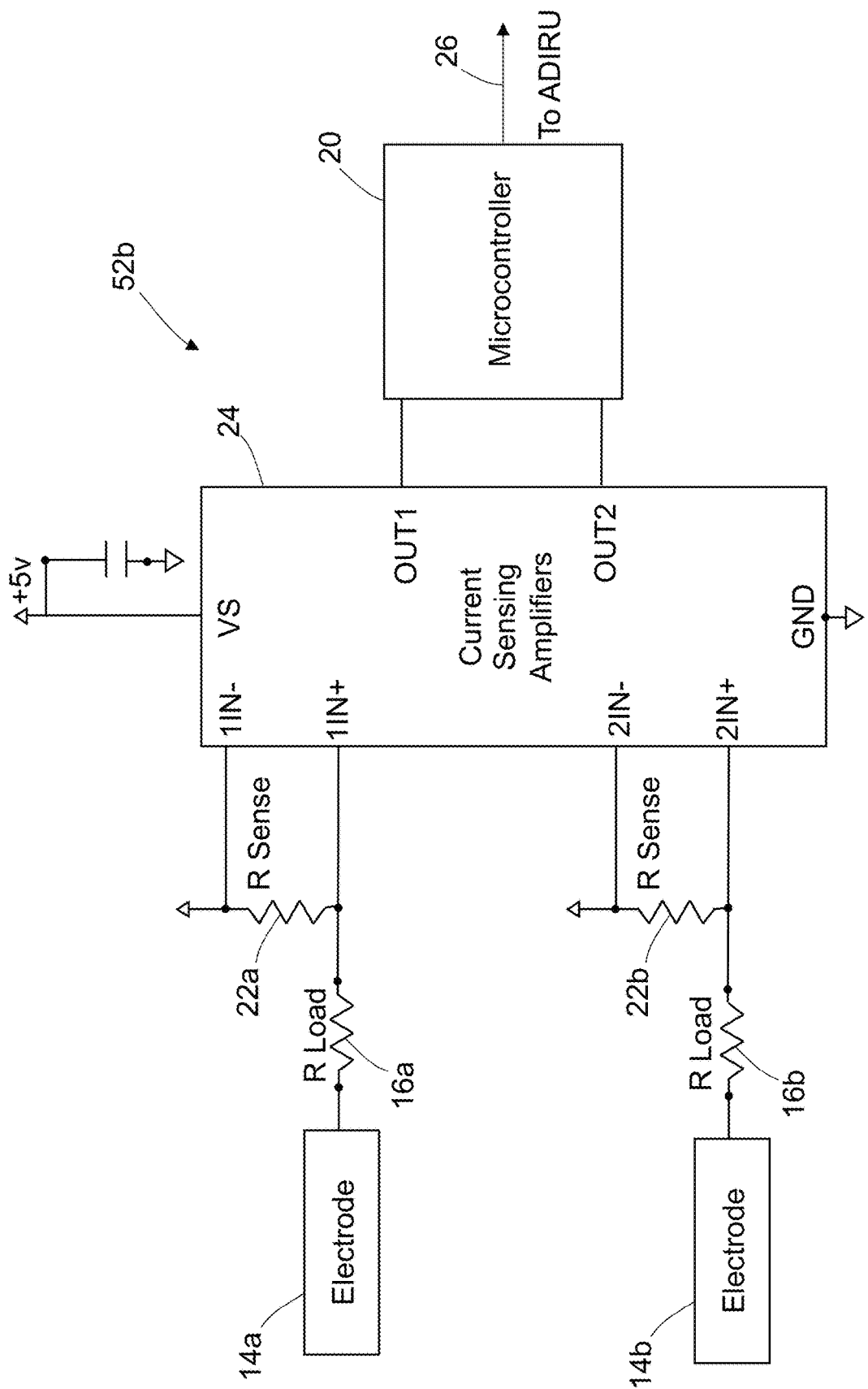
FIG. 4 is a circuit diagram identifying components of a solid-state ionic air data module in accordance with another proposed implementation.

FIG. 4 is a circuit diagram identifying components of a solid-state ionic air data module 52b (hereinafter "ionic air data module 52b"). The ionic air data module 52b reads the outputs from the collector electrodes 14a and 14b and integrates the signals to get current readings. The time integration of the electric current in each of the collector electrodes 14a and 14b is a measure of total electric charge. In the implementation depicted in FIG. 4, the two current sensors of ionic air data module 52a are current sensing amplifiers integrated into a dual-channel current sensing amplifier integrated circuit 24, which current sensing amplifiers integrate the electrical currents from collector electrodes 14a and 14b. The current sensing amplifiers of dual-channel current sensing amplifier integrated circuit 24 are electrically connected to collector electrodes 14a and 14b by respective load resistors 16a and 16b. The current sensing amplifiers of dual-channel current sensing amplifier integrated circuit 24 use respective current-sense resistors 22a and 22b to convert the load current to a small voltage, which is then amplified by the current sensing amplifiers. In the alternative, two single-channel current sensing amplifier integrated circuits or two channels of a quad-channel current sensing amplifier integrated circuit may be employed. A quad-channel current sensing amplifier integrated circuit would also be suitable for use in embodiments having three or four collector electrodes instead of two.

The ionic air data module 52b depicted in FIG. 4 further includes a microcontroller 20 of the type previously described with reference to FIG. 3. The microcontroller 20 is configured to compute an ionic air data parameter value based at least in part on the respective voltages at the output terminals of current sensing amplifier integrated circuit 24. The output terminal of microcontroller 20 is electrically connected to a data distribution bus 26 for sending computed air data parameter values to an air data computer or to the air data processor of an ADIRU.

The microcontroller 20 is a single integrated circuit with various features. In accordance with one proposed implementation, microcontroller 20 includes an analog-to-digital converter that provides digital inputs to a lookup table that converts the relationship (e.g., difference or ratio) between the two voltages at the input terminals into an air data parameter value. The microcontroller 20 also includes a central processing unit, volatile memory (RAM) for data storage, and ROM, EPROM, EEPROM or flash memory for program and operating parameter storage. In accordance with one embodiment, the microcontroller 20 comprises a non-transitory tangible computer-readable storage medium storing a calibration table which correlates relationships between respective magnitudes of first and second currents and air data parameter values recorded during testing.

Figure 5:
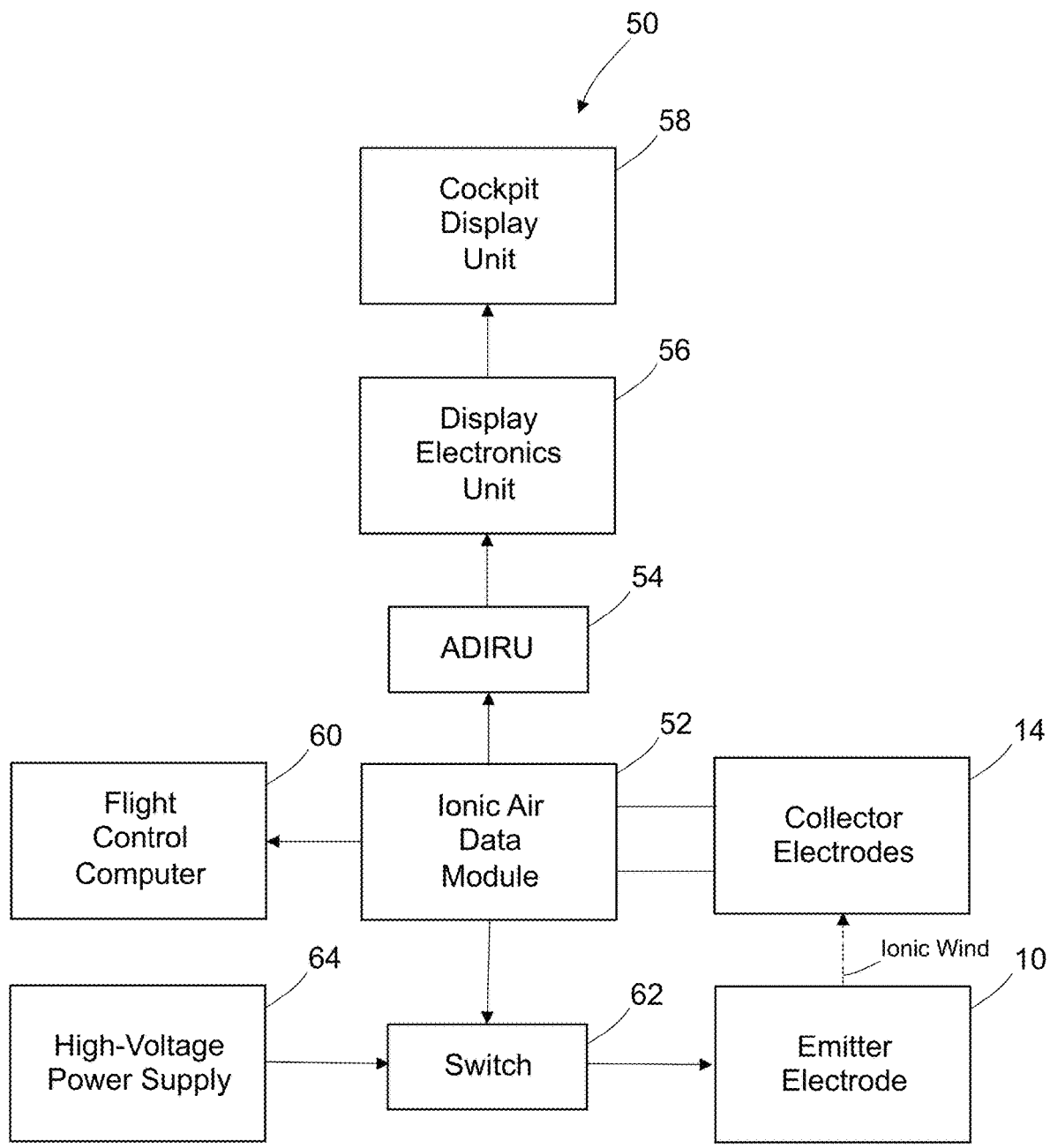
FIG. 5 is a block diagram identifying components of an aircraft equipped with a system for air data computation using ionic charge sensing.

FIG. 5 is a block diagram identifying components of an aircraft equipped with a system 50 for air data computation using ionic charge sensing in accordance with one embodiment. The system 50 includes an emitter electrode 10, a plurality of collector electrodes 14 arranged downstream from emitter electrode 10, and an ionic air data module 52 electrically connected to the collector electrodes 14. The emitter electrode 10 is electrically connected to a high-voltage power supply 64 via a switch 62 when the latter is closed. The state of switch 62 is controlled by the ionic air data module 52. As previously described, the emitter electrode 10 generates corona discharge in response to receipt of electric power from the high-voltage power supply 64 when switch 62 is closed.

The system 50 further includes an ADIRU 54 and a flight control computer 60, both of which are communicatively coupled to ionic air data module 52 via respective data distribution busses. The ionic air data module 52 sends calculated ionic air data parameter values digitally to ADIRU 54 and to flight control computer 60. The ADIRU 54 is configured to compute air data parameter values based on ionic air data parameter values received from microcontroller 20 and other air data parameter values received from other sensors or data modules. In addition, system 50 includes a display electronics unit 56 (e.g., a computer or processor) which is communicatively coupled to ADIRU 54 and a cockpit display unit 58 which is in turn communicatively coupled to display electronics unit 56. In response to receipt of an air data parameter value from ADIRU 54, the display electronics unit 56 controls the cockpit display unit 58 to present alphanumeric or graphical symbology representing that air data parameter value for viewing by the flight crew. In addition or in the alternative, an aural annunciator may be provided for announcing the air data parameter value.

In accordance with one embodiment, the ionic air data module 52 comprises a non-transitory tangible computer-readable storage medium which stores correlated ionic air data based on recorded parametric values acquired during lab and flight testing. In one proposed implementation, the non-transitory tangible computer-readable storage medium stores a data reference table which correlates relationships between respective magnitudes of first and second currents induced in a pair of collector electrodes and ionic air data parameter values recorded during testing.

An ionic air data parameter value calculated by an ionic air data module may be received from the ionic air data module 52 (e.g., from microcontroller 20) by an ADIRU 54 and used to calculate an air data parameter value. For example, the relationship of interest may be a difference between the magnitudes of the first and second currents respectively induced in a pair of collector electrodes 14. In one proposed implementation, the ADIRU 54 is configured to compute an estimated airspeed which is a function of aircraft velocity and the ionic air data parameter value received from the ionic air data module 52. In another proposed implementation, the ADIRU 54 is configured to compute an estimated pressure altitude which is a function of static pressure outside the aircraft and the ionic air data parameter value received from the ionic air data module 52.

In a further proposed implementation, the ADIRU 54 is configured to compute an estimated total air temperature which is a function of static air temperature outside the aircraft and the ionic air data parameter value received from the ionic air data module 52. For another example, the relationship of interest may be a ratio between the respective magnitudes of the first and second currents. In one proposed implementation, the ionic air data parameter output by the ionic air data module 52 is an estimated angle of attack and the estimated angle of attack is a function of the ratio of the magnitudes of the first and second currents respectively induced in a pair of collector electrodes 14. In an alternative implementation, the ionic air data parameter output by the ionic air data module 52 is an estimated sideslip.

Fly-by-wire airplanes attempt to limit angle of attack to prevent an unfavorable flight condition that can occur at high angles of attack including reduction of lift beyond acceptable limits, high-speed buffet, pitch up, lateral-directional instabilities or combinations of these. These conditions can be avoided by limiting the angle of attack to something at or slightly below the angle of attack beyond which these undesirable characteristics occur. Angle of attack is closely related to velocity (airspeed) and increases inversely with velocity. However, a rapid deceleration can cause the current angle of attack to quickly exceed a desired angle-of-attack limit and leave the aircraft exposed to a condition that is difficult to control or any of the other undesirable characteristics noted above. True angle of attack can be determined during steady flight as the difference between the pitch attitude angle and flight path climb angle of the airplane.

In accordance with one embodiment, the microcontroller 20 may be configured to act as a digital resolver that outputs signals representing the angle of attack. A resolver is an angular position sensor that measures the angle or amount of rotation of a shaft. The proposed digital resolver would provide an angular position signal for the aircraft, so that the difference between the aircraft's actual angle of attack and a desired angle of attack can be determined. This difference is used according to well-known flight control principles to effect an appropriate change in the pitch angle of the aircraft toward the desired angle of attack. For example, the digital resolver may be configured to provide a sine signal and a cosine signal that, taken together, are indicative of the angle of attack. The output sine and cosine signals may be amplified and then digitized to provide digital angular position information for use by a digital flight control computer.

While systems and methods for air data computation using ionic charge sensing have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used herein, the term "computer system" comprises a single processing or computing device or multiple processing or computing devices that communicate via wireline or wireless connections. A processing or computing device may include any one of the following: processor, a computer, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein.

The methods described herein may be encoded as executable instructions embodied in a non-transitory tangible computer-readable storage medium, including, without limitation, a storage device and/or a memory device. Such instructions, when executed by a processing or computing device, cause the device to perform at least a portion of the method described herein.

In the method claims appended hereto, the alphabetic ordering of steps is for the sole purpose of enabling subsequent short-hand references to antecedent steps and not for the purpose of limiting the scope of the claim to require that the method steps be performed in alphabetic order. As used in the claims, the term "plurality" means two or more.

The invention claimed is:

1. A method for air data computation using ionic charge sensing during flight of an aircraft, comprising:
generating a first voltage difference between an emitter electrode and a first collector electrode coupled to an outer surface of the aircraft and exposed to ambient air, the first collector electrode being aft of the emitter electrode, wherein a voltage supplied to the emitter electrode is high enough to ionize air molecules in a region surrounding the emitter electrode and the first voltage difference is large enough and the first collector electrode is sufficiently close to the emitter electrode to cause a first current to be produced in the first collector electrode;
generating a second voltage difference between the emitter electrode and a second collector electrode coupled to the outer surface of the aircraft and exposed to ambient air, the second collector electrode being aft of the emitter electrode, wherein the second voltage difference is large enough and the second collector electrode is sufficiently close to the emitter electrode to cause a second current to be produced in the second collector electrode;
determining a first magnitude of the first current and a second magnitude of the second current; and
computing an air data parameter value based on a static sensor parameter and a particular difference between the first magnitude and the second magnitude.

2. The method of claim 1, further comprising computing a sideslip based on the first magnitude and the second magnitude.

3. The method of claim 1, further comprising computing an estimated airspeed which is a function of a velocity of the aircraft and the particular difference.

4. The method of claim 1, wherein the air data parameter value comprises an estimated pressure altitude, and wherein the static sensor parameter comprises a static pressure outside the aircraft.

5. The method of claim 1, wherein the air data parameter value comprises an estimated total air temperature, and wherein the static sensor parameter comprises a static temperature outside the aircraft.

6. The method of claim 2, further comprising annunciating an air data parameter value in a manner that is perceptible to an operator seated in a cockpit or on a flight deck of the aircraft, wherein the air data parameter value is based in part on the particular difference.

7. The method of claim 6, wherein annunciating comprises displaying symbology representing the air data parameter value on a cockpit display unit.

8. The method of claim 1, further comprising determining a particular ratio of the first magnitude and the second magnitude.

9. The method of claim 8, further comprising computing an estimated angle of attack based on the particular ratio.

10. An aircraft comprising:
an exterior skin;
a power supply;
an emitter electrode connected to the power supply and disposed at a first position coupled to the exterior skin and exposed to ambient air;
a first collector electrode connected to ground and disposed at a second position coupled to the exterior skin and exposed to ambient air, the second position being aft of the first position;
a second collector electrode connected to ground disposed at a third position coupled to the exterior skin and exposed to ambient air, the third position being aft of the first position;
a first current sensor having an input connected to the first collector electrode and having an output, the first current sensor configured to determine a first magnitude of a first current;
a second current sensor having an input connected to the second collector electrode and having an output, the second current sensor configured to determine a second magnitude of a second current; and
a processor configured to compute an air data parameter value based on a static sensor parameter and a difference between the first magnitude and the second magnitude, wherein the emitter electrode, the first collector electrode, and the second collector electrode are configured and arranged so that respective currents are induced in the first and second collector electrodes by ionic wind flowing from the emitter electrode toward the first and second collector electrodes while power is being supplied to the emitter electrode during flight of the aircraft.

11. The aircraft of claim 10, further comprising a non-transitory tangible computer-readable storage medium storing a calibration table which correlates relationships between respective magnitudes of first and second currents and air data parameter values recorded during testing.

12. The aircraft of claim 10, further comprising a microcontroller configured to compute the difference between the first magnitude and the second magnitude.

13. The aircraft of claim 11, wherein the processor is an air data processor of an air data and inertial reference unit (ADIRU).

14. The aircraft of claim 13, wherein the ADIRU is configured to compute an estimated airspeed based on a velocity of the aircraft and the difference between the first magnitude and the second magnitude.

15. The aircraft of claim 13, wherein the ADIRU is configured to compute an estimated pressure altitude which is a function of static pressure outside the aircraft and the difference between the first magnitude and the second magnitude.

16. The aircraft of claim 13, wherein the ADIRU is configured to compute an estimated total air temperature which is a function of static air temperature outside the aircraft and the difference between the first magnitude and the second magnitude.

17. The aircraft of claim 10, further comprising a microcontroller that is configured to compute a ratio of the first magnitude and the second magnitude.

18. The aircraft of claim 17, wherein processor is further configured to compute an estimated angle of attack based on the ratio of the first magnitude and the second magnitude.

19. A method for air data computation using ionic charge sensing during flight of an aircraft, comprising:
generating a first voltage difference between an emitter electrode and a first collector electrode coupled to an outer surface of the aircraft and exposed to ambient air, the first collector electrode being aft of the emitter electrode, wherein a voltage supplied to the emitter electrode is high enough to cause corona discharge in a region surrounding the emitter electrode and the first voltage difference is large enough and the first collector electrode is sufficiently close to the emitter electrode to cause a first current to be produced in the first collector electrode by the corona discharge;
generating a second voltage difference between the emitter electrode and a second collector electrode coupled to the outer surface of the aircraft and exposed to ambient air, the second collector electrode being aft of the emitter electrode, wherein the second voltage difference is large enough and the second collector electrode is sufficiently close to the emitter electrode to cause a second current to be produced in the second collector electrode by the corona discharge;
determining a first magnitude of the first current and a second magnitude of the second current; and
computing an air data parameter value based on a static sensor parameter and a difference between the first magnitude and the second magnitude.

20. The method of claim 19, wherein:
the outer surface has an aerodynamic surface and first, second, and third cavities which are open to an ambient atmosphere, the first cavity being disposed at a position which is forward of respective positions of the second and third cavities;
the emitter electrode comprises a first electrically conductive wire which is connected to a power supply and has a tip which is disposed in or protrudes from the first cavity;
the first collector electrode comprises a second electrically conductive wire which is connected to ground and is disposed in the second cavity;
the second collector electrode comprises a third electrically conductive wire which is connected to ground and is disposed in the third cavity; and
the second and third electrically conductive wires are straight, mutually coaxial, separated by a gap, and arranged so that respective currents are induced in the first and second collector electrodes by corona discharge flowing perpendicular to the first and second collector electrodes in a boundary layer adjacent the aerodynamic surface while power is being supplied to the emitter electrode during flight of the aircraft.

* * * * *